US006963452B2

(12) United States Patent
Moulin

(10) Patent No.: US 6,963,452 B2
(45) Date of Patent: Nov. 8, 2005

(54) COMPACT IMAGING HEAD AND HIGH SPEED MULTI-HEAD LASER IMAGING ASSEMBLY AND METHOD

(75) Inventor: Michel Moulin, Apples (CH)

(73) Assignee: Kodak Polychrome Graphics LLC, Norwalk, CT (US)

( * ) Notice: Subject to any disclaimer, the term of this patent is extended or adjusted under 35 U.S.C. 154(b) by 96 days.

(21) Appl. No.: 10/700,204

(22) Filed: Nov. 3, 2003

(65) Prior Publication Data

US 2004/0130772 A1 Jul. 8, 2004

Related U.S. Application Data

(60) Division of application No. 09/865,345, filed on May 25, 2001, now Pat. No. 6,643,049, said application No. 09/865, 345, is a continuation-in-part of application No. PCT/US01/ 40002, filed on Feb. 1, 2001, and a continuation-in-part of application No. PCT/US01/40003, filed on Feb. 1, 2001.

(51) Int. Cl.$^{7}$ .......................... G02B 27/10; G02F 1/33; G03B 27/34; B41J 2/435; B41B 15/00

(52) U.S. Cl. ......................... 359/618; 359/305; 355/57; 347/235; 347/250; 396/549

(58) Field of Search ................................ 359/618, 305, 359/346, 351, 857, 259; 355/57, 60, 65, 66, 71, 88; 347/235, 238, 250, 255; 396/549

(56) References Cited

U.S. PATENT DOCUMENTS

| | | | | |
|---|---|---|---|---|
| 4,281,904 A | | 8/1981 | Sprague et al. | 359/263 |
| 4,617,578 A | * | 10/1986 | Nezu et al. | 347/239 |
| 4,661,828 A | * | 4/1987 | Miller, Jr. et al. | 347/241 |
| 4,746,942 A | | 5/1988 | Moulin | 396/549 |
| 4,819,018 A | * | 4/1989 | Moyroud et al. | 396/549 |
| 5,796,511 A | | 8/1998 | Allen et al. | 359/305 |
| 6,094,300 A | | 7/2000 | Kashima et al. | 359/385 |
| 6,130,751 A | | 10/2000 | Haginiwa et al. | 356/401 |
| 6,137,631 A | | 10/2000 | Moulin | 359/618 |
| 6,166,759 A | | 12/2000 | Blanding | 347/242 |
| 6,169,565 B1 | | 1/2001 | Ramanujan et al. | 347/238 |
| 6,222,666 B1 | | 4/2001 | Moulin | 359/246 |
| 6,384,969 B1 | | 5/2002 | Kanai et al. | 359/431 |
| 6,493,130 B2 | * | 12/2002 | Iizuka | 359/305 |

FOREIGN PATENT DOCUMENTS

| | | |
|---|---|---|
| WO | 00/49463 | 8/2000 |
| WO | 00/54096 | 9/2000 |

OTHER PUBLICATIONS

PCT/US01/40002 application.
PCT/US01/40003 application.

* cited by examiner

*Primary Examiner*—Loha Ben
(74) *Attorney, Agent, or Firm*—Faegre & Benson, LLP

(57) ABSTRACT

An optical head having a laser source of beams at an input end and image forming beams at an output end and a plurality of optical components arranged along the beams between the input and output ends to obtain an image on a photosensitive printing plate from the beams. The optical components include reflecting surfaces adapted to fold the beams several times between the input and output ends times in such a way as to reduce the width and height of the optical head. The folded beams are located in a plurality of parallel surfaces perpendicular to the image formed on the photosensitive printing plate. The optical head further includes optical components adapted to adjust the width, location, orientation and intensity of the image from the beams.

23 Claims, 12 Drawing Sheets

COMPACT IMAGING HEAD AND HIGH SPEED MULTI-HEAD LASER IMAGING ASSEMBLY AND METHOD

The present application is a divisional application of, and claims priority to U.S. patent application Ser. No. 09/865,345, entitled COMPACT IMAGING HEAD AND HIGH SPEED MULTI-HEAD LASER IMAGING ASSEMBLY AND METHOD, filed on May 25, 2001, now U.S. Pat. No. 6,643,049. U.S. patent application Ser. No. 09/865,345 is a continuation-in-part of PCT application No. PCT/US01/40002 filed Feb. 1, 2001, which published in English on Aug. 9, 2001, and PCT application No. PCT/US01/40003 filed Feb. 1, 2001, which published in English on Aug. 9, 2001, both of which are incorporated herein by reference.

BACKGROUND OF THE INVENTION

1. Field of the Invention

The present invention relates to a compact imaging head, a high speed multi-head laser imaging assembly comprising a plurality of such heads, and a method of imaging heat or light sensitive media using such an assembly. In particular, the assembly comprises a plurality of compact imaging heads (referred to as modules when they are interchangeable) which operate in unison to direct radiation from groups of laser emitters to modulators. The assembly and method of the present invention are capable of directing radiant energy produced by each module for imaging heat or light sensitive media such as a printing plate.

2. Background Information

Some of the current trends in the thermal offset printing plate industry have been in the area of increased productivity, especially as they relate to so-called "Computer to Plate" (CTP) systems. However, such conventional systems are presently limited, especially as they relate to imaging of thermal offset plates. Conventional internal drum systems are limited, for example, with respect to the spinning speed of the mirror, the commutation time on/off of the laser beam (for acousto-optic modulators with YAG lasers, red and UV laser diodes and optical fiber lasers), and power of the laser sources. Conventional external drum systems which have a plurality of laser sources such as diodes are limited, for example, with respect to respective rotational speeds, respective number of diodes and the total power generated thereby. Conventional external drums employing a spatial modulator also have power limitations as well as limitations with respect to the number of spots produced thereby. Conventional flat bed systems have "width of plate" limitations, resolution limitations, as well as limited scanning speeds, modulation frequencies and power of the respective laser source.

A conventional system in which a laser beam is widened in one dimension to cover an array of a substantial number of electro-optic gates (so that a large number of adjacent spots can be formed and thus constitute a "wide brush") is described in U.S. Pat. No. 4,746,942, which is incorporated herein by reference. In particular, this patent discloses that the beam is divided by the gates into a plurality of potential spot-forming beams. The transmission of each beam to a photosensitive surface for imaging is selectively inhibited in accordance with a pre-determined pattern or program, while the beams are swept relative to the photosensitive surface to form characters and other images.

However, the number of spots of the brush described in this patent may be limited by optical aberrations. In addition, the power that a single laser source can produce limits the imaging speed of thermo-sensitive plates because of their low sensitivity. The performance of a spatial modulator with a single laser source can also be limited. Conventional "brush" systems generally use spatial modulators such as, e.g., electro-optic ferro-electric ceramic (PLZT) modulators, total internal reflection (TIR) modulators and micro-mirrors, are similarly limited.

TIR modulators based on the use of $LiNbO_3$ crystals are of particular interest because of their commutation speed. This type of modulator is described in the literature and several patents such as in U.S. Pat. No. 4,281,904, which is incorporated herein by reference. However, for the imaging of thermo-sensitive plates where a high level of energy is necessary, the crystal is submitted to a strong energy density that induces photorefraction effects which negatively affect the operation of the modulator. These effects, known as "optical damage, dc drift" limit the amount of energy which can be handled.

An imaging "head" comprising a source of laser energy, associated optics, and a modulator capable of generating a line segment or "brush" is described in co-assigned U.S. Pat. No. 6,137,631, which is incorporated herein by reference. Such a module or head typically projects a thin (i.e. 12 micron) line-segment or brush having a width of 5.2 mm (i.e. a 256 pixel line segment). The imaging productivity of an imaging system is disadvantageously limited by the small size of such a line-segment.

One of the objects of the present invention is to overcome the limitations and disadvantages of the above-described conventional CTP systems by increasing their productivity. Another object of the present invention is to increase the number of spots generated using a laser beam by juxtapositioning the brushes produced by a plurality of compact imaging heads such that each head produces several hundreds light spots. Thus, the available power and the pixel rate of conventional CTP systems can be multiplied by the number of heads provided in the assembly and method of the present invention. It is another object of this invention that the system of this invention may be employed in internal and external drum systems, as described above, as well as in flat bed platesetter systems, such as described in WO 00/49463, the entire disclosure of which is incorporated herein by reference. It is yet another object of this invention to provide a compact imaging head which may be employed in the assembly and method of this invention, where it is also referred to as a "module."

It is one feature of this invention that the brushes of light produced by each module in the head assembly are controlled to provide a continuous scan line which is the aggregate of the individual brushes emitted from each head, thereby avoiding any gaps in the overall scan line employed for imaging. It is another feature of this invention that the width, orientation, shape, power and timing of each brush is controlled to permit the aggregate of individual brushes to be employed as a continuous scan line. The system and method of this invention thus advantageously are able to overcome the limitations of existing "single head" systems which are usually limited to small (e.g. 256 pixel) line segments. Other objects, features and advantages of the system and method of this invention will be apparent to those skilled in the art.

SUMMARY OF THE INVENTION

Several optical heads are mounted on a common carriage adapted to scan a photosensitive printing plate. Each head is equipped with a laser source, a modulator and projection optics and can project an image (i.e. "brush") of the active zone of the modulator containing a plurality of pixels. The optical track of beams in each head is folded several times in such a way as to reduce the width of the head. When the carriage moves from one edge of the plate to the other edge a swath of pixels is projected as if painted by the brush. Each head includes means to adjust the height, spatial position, orientation and intensity of the brush it generates. Each head is accurately positioned on the carriage so that at least two abutting swaths are projected during each sweep of the carriage to produce a wider swath. The carriage generates pulses indicative of its position relative to the location of the plate edges. Each head is capable of receiving a signal to time the projection of brushes. The relative movements between the carriage and the photosensitive plate are controlled by electronic means.

BRIEF DESCRIPTION OF THE DRAWINGS

FIGS. 3A', 3B' and 3C' represent the elements involved in the adjustment of optical elements in this invention.

DETAILED DESCRIPTION OF THE INVENTION

This invention and its various embodiments will become apparent from the following detailed description and specific references to the accompanying figures.

Compact Imaging Modules

Figure 2A:
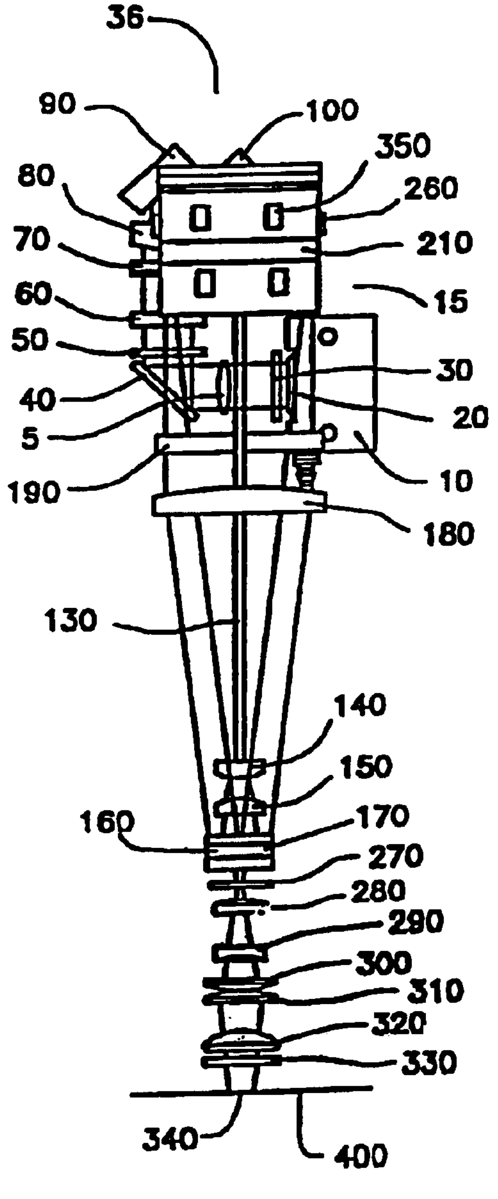
FIGS. 2A and 2B are elevation and side views respectively of a compact imaging module in accordance with an embodiment of this invention.
Figure 2B:
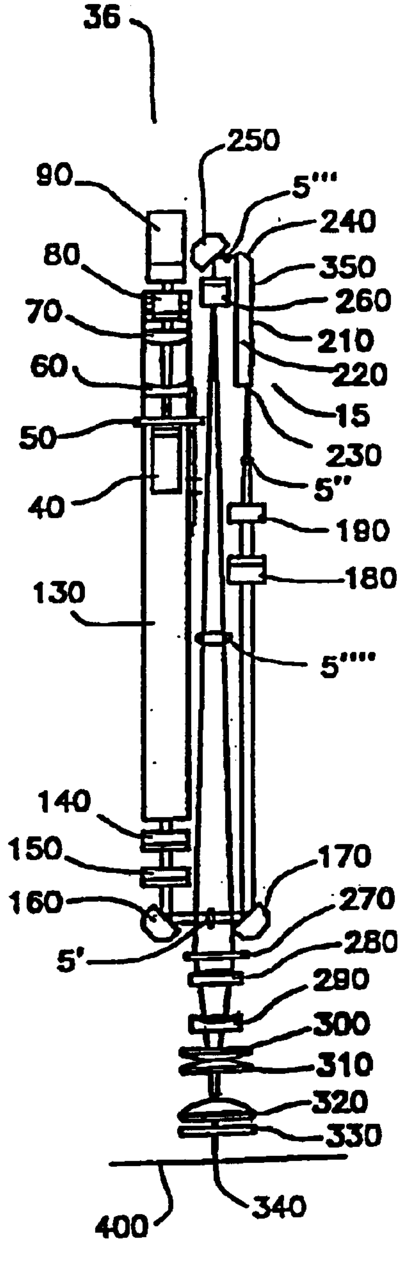
Figure 3A:
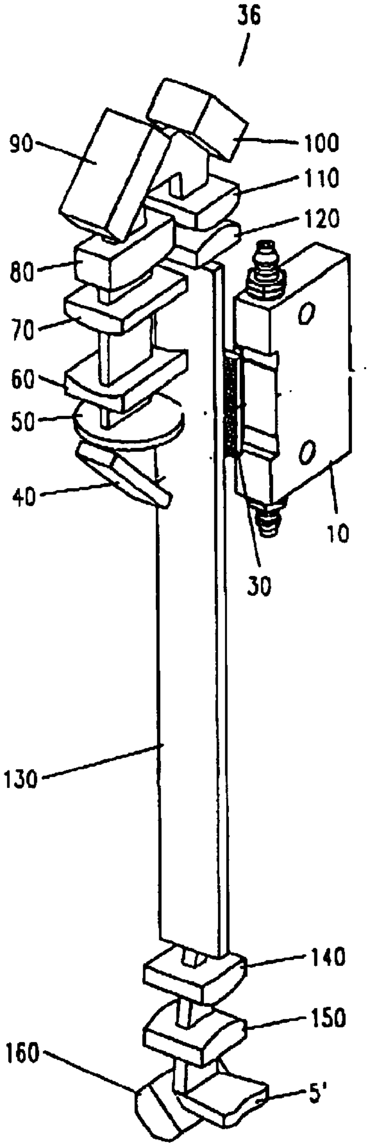
FIGS. 3A, 3B and 3C represent exploded views of the imaging module of FIGS. 2A and 2B divided into three sections located on different planes.
Figure 3B:
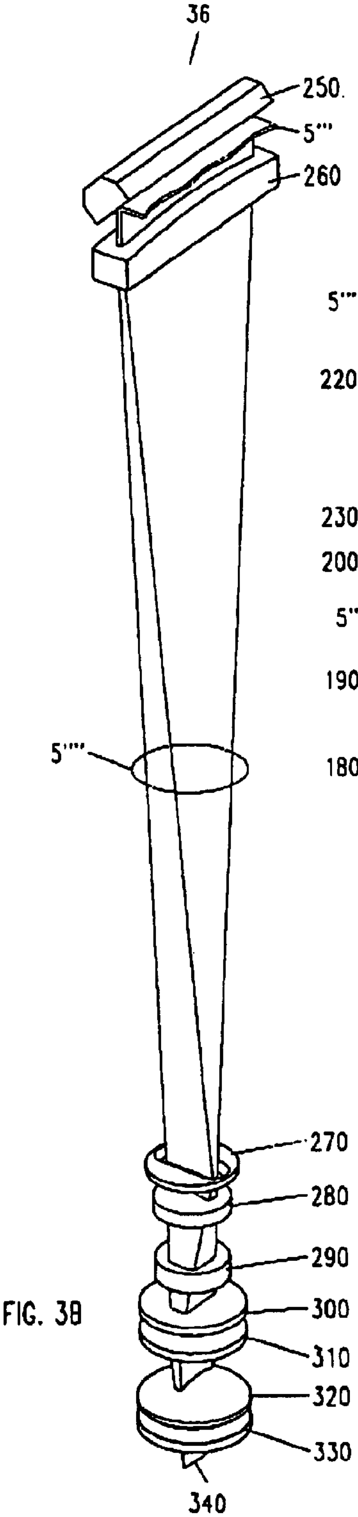
Figure 3C:
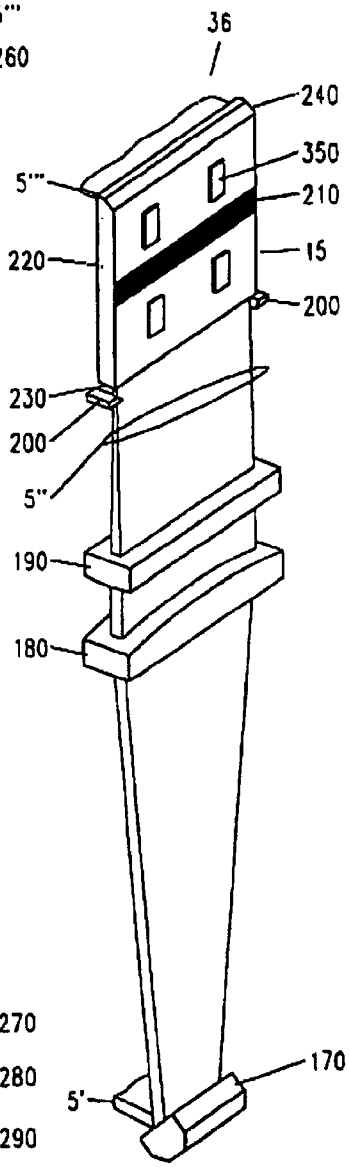

FIGS. 2A and 2B show enlarged side views of an exemplary compact imaging module or head 36 which may be used in the assembly and method of the present invention. FIGS. 3A–3C show exploded elevation views of different sections of the module 36 illustrated in FIGS. 2A and 213, located on different respective planes. This module 36 has a laser source 10 (typically a laser bar or laser diode array comprising a plurality of emitters) emitting a bundle of rays 5 (see FIG. 2A), and arranged thereon which is attached to a support arrangement (not shown in FIGS. 2A and 2B). The laser source 10 described herein is cooled by a liquid flowing through micro channels. Such as laser source may be obtained from Jenoptik Laserdiode, GmbH, as type JOLD-32-CAFC-1L, having a power of 32 watts. This particular laser source 10 described herein is a bar that is one-centimeter long and includes nineteen (19) emitters, although other laser sources may also be used.

Collimating lens 20 is positioned to collimate the fast axis of the laser rays from laser source 10. In this embodiment, collimating lens 20 is a type FAC-850D lens available from Limo-Lissotschenko Microoptik GmbH, although other lenses may also be used. When the bundle of rays 5 is projected therethrough, due to the aspherical cylindrical profile of collimating lens 20 combined with a glass of high refractive index, a resultant beam which approaches the diffraction limit is produced. The beam divergence along a slow axis is reduced by an array of cylindrical lenses 30 (shown in FIG. 2A as a single lens) provided in the module 36.

Each of the cylindrical lenses 30 provided in the module 36 preferably corresponds to one emitter of the laser source 10. Upon exiting from the cylindrical lenses 30, the beams are reflected by polarizing mirror 40 and reach imaging (half-wave) blade 50. Half-wave blade 50 makes it possible, upon the beams' exit therefrom, to position the polarization plane of the beam in the direction where the efficiency of a modulator 15 (also provided in the module 36) is optimum. A group of two cylindrical lenses 60 and 70 are utilized for controlling or adjusting the divergence of the beams along the fast axis by adjusting the distance between these lenses 60 and 70. This distance adjustment between lenses 60 and 70 effects the width of the beam output at plate location 400. In this manner, it is thus possible to adjust the beam output of the module 36 which, in its unadjusted state, produces respective beams having different beam widths. In addition, if it is determined that the module 36 is outputting a beam having beam characteristics which have been degraded or changed (e.g., a change in the beam width due a defect of a particular imaging component of the module), it is possible to use the above-described adjustment capability of the two cylindrical lenses 60 and 70 to compensate for certain irregularities of the components within the module 36.

After exiting cylindrical lenses 60 and 70, the beams are projected through another lens 80, reflected from the mirrors 90 and 100, and directed toward lenses 110 and 120 (shown in FIG. 3A). Due to the presence of mirrors 90 and 100, the size of the module 36 may be reduced. This can be done, at least in part, by reflecting or folding the beams with mirrors 90 and 100. A further reduction of the module size by "folding" the beams is discussed in further detail below. The lenses 80, 110 and 120 are arranged in a telecentric objective arrangement which collects the beams emerging from the laser source 10 of the module 36. These lenses 80, 110, and 120 modify the characteristics of the beams entering therein to form an image of the emitters at an input face of an optical mixer (here mixing blade 130) along the slow axis of the laser source. The optical mixer is capable of equalizing the energy beams received from the laser diode array. As described above, the group or combination of optical components 20, 30 and 80 are capable of shaping and directing energy rays from the laser source 10 to the input of the optical mixer.

Thereafter, the beams enter into a group of cylindrical lenses 140 and 150 from an output end of blade 130 (i.e., directly through the lenses 140, 150), then reflect or fold via mirrors 160 and 170 as shown, and finally enter lens 180. The mirrors 160 and 170 are preferably located in an imaging track (i.e., along the beam path) so as to reflect or fold the beam again, which facilitates the size reduction of module 36. The resultant slow axis beams exiting from the cylindrical lenses 140, 150, 180 form an image of the exit face of the mixer blade at the center 210 of modulator 15. The combination or group of lenses 140, 150 is capable of directing and focalizing slow-axis rays emerging from the output of the optical mixer 130 to the focal point 500 of lens 180, which is capable of directing slow-axis rays from the focal point 500 to the modulator 15. This arrangement of the cylindrical lenses 140, 150, 180 also has telecentric characteristics along the slow axis. Thus, a uniform distribution of light on the modulator 15 can be generated for the image. The uniform distribution of light using modulator 15 is also described in co-assigned U.S. Pat. No. 6,137,631, the entire disclosure of which is incorporated herein by reference.

Before reaching the modulator, the beams are directed to another cylindrical lens 190 which focalizes and directs the beams of the fast axis to the active zone of the modulator 15. The width of the resultant beams (e.g., a bundle of rays) is limited at an entrance to the modulator 15 by certain mechanical elements 200 (e.g. stops). One exemplary modulator 15 can be a TIR-type modulator whose active zone has a column of 256 active elements, which are controlled by four drivers 350 (e.g., SUPERTEX INC HV57708, available from Supertex, Inc., Sunnyvale, Calif.). The modulation of light as well as the projection of modulated light for the projection of individual light brushes (as described below) may be achieved using the modulation and projection techniques and equipment described in, for example, U.S. Pat. Nos. 4,746,942 and 6,137,631, both of which are incorporated herein by reference in their entirety. As shown and described in copending U.S. Pat. No. 6,222,666, the entire disclosure of which is incorporated herein by reference, the modulator 15 can be divided into an active imaging central zone which is controlled by one or more drivers for imaging a column of 256 spots and lateral zones. These drivers (e.g., drivers 350) can be directly attached to crystal 220, and may be encapsulated to increase their resistance to shock. The modulator 15 preferably operates in the mode known as a "bright field." Thus, the beams are directed to modulator 15 which modifies or configures these beams using drivers 350 and mechanical elements 200.

In particular, the light beams 5" enter the crystal 220 via crystal face 230 angled by five degrees relative to the normal at a plane of the crystal 220. Thus, the beams are deviated in the crystal 220, and submitted to a total reflection in the active zone of the modulator 15 with a small angle of incidence. The modified beams 5"" exit the crystal 220 in a direction which is perpendicular to the plane of the crystal 220 after another reflection of the beams at prismatic face 240 of the crystal 220 takes place. The composition of the crystal 220 is preferably selected so as to avoid photorefraction effects (e.g., imaging damage, DC drift, etc.) at high energy density. A preferred crystal composition is $LiNbO_3$ with about 5 mol % of MgO or about 7 mol % of Zn. In a particularly preferred embodiment, the modulator is a TIR modulator comprising a total reflection crystal having at least one prismatic edge capable of deviating rays by 90 degrees.

Thereafter, as shown in FIG. 3B, beams 5"" reach lens 260 via another mirror 250. Lens 260 is capable of collecting rays emerging from the active zone to form an image (500') on stop element (270), which is capable of eliminating unwanted rays. Mirror 250 redirects the beams toward stop element 270 preferably located close to the Fourier transform plane at the focus of lens 260 for the purpose of blocking rays of higher diffraction order as is well known in the art. A calibrated opening or slit of stop element 270 allows the undiffracted rays to go through and proceed toward the following optical elements. In one embodiment of the invention, the stop element is independent of the objective group comprising elements 280, 290, 300, 310 and 320. The same circulating coolant such as a water circuit used by the laser bar may be used to insure thermal stability. The height of this image is adjusted by changing the distance between spherical lens 260 and stop element 270. Accurate centering of image 340' on the aperture of the stop element is obtained by the lateral displacement of lens 180. Rays emerging from the aperture of element 270 enter imaging lens group 280, 290, 300, 310, 320 and 330. These lenses relay the image 340' of the exit face 240 of modulator 220 to the photosensitive face of the plate 400 where it is shown at 340. Lens 320 of the objective lens assembly can be used to modify the focal plane without affecting the size of image 340.

Figure 2C:
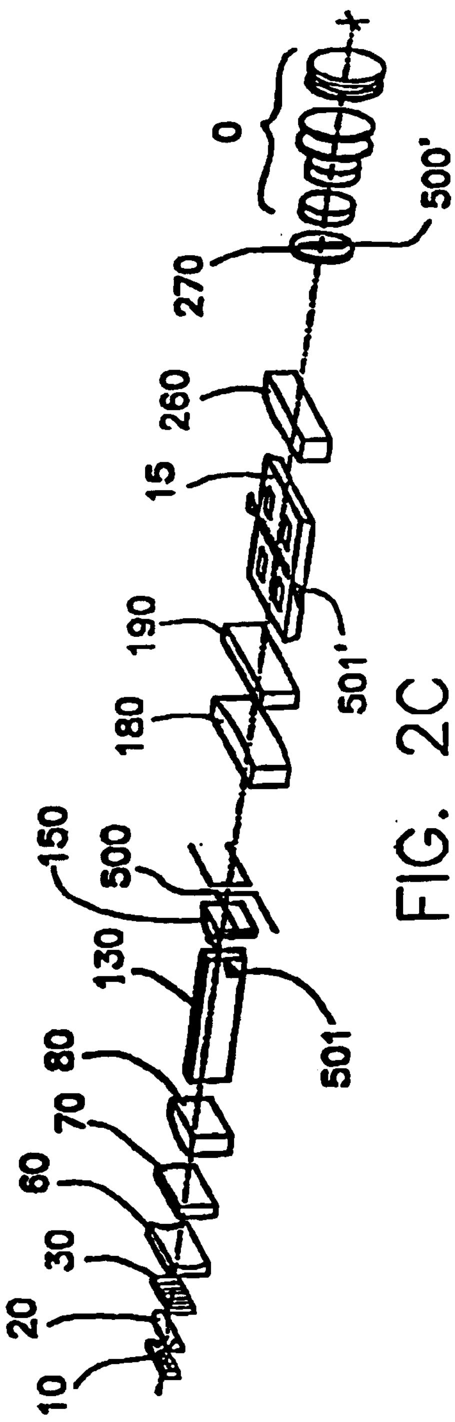
FIG. 2C is a schematic representation in exploded view of the major optical components of a head.
Figure 2D:
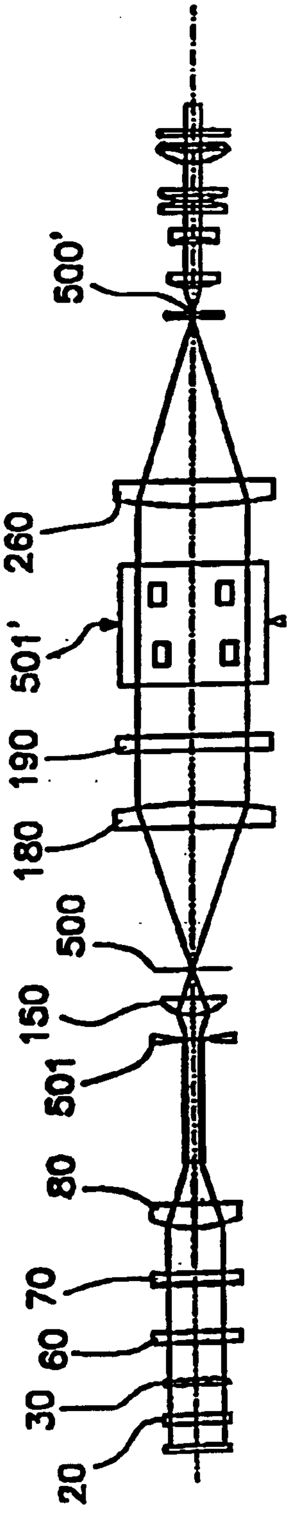
FIG. 2D is a schematic representation in exploded view of the components of FIG. 2C as they affect slow-axis rays.

It is another object of the invention to reduce the size of each head by folding beams as schematically represented in FIG. 2C, placing the optical components in substantially the same plane, as shown also in FIGS. 2A and 2B. In this manner the height of the head is considerably reduced and the width of the head (represented by W in FIG. 7) is kept at its minimum. The plane represented by the folded beams is preferably perpendicular to the brush image 340. It is thus possible to produce compact modules of reduced height and minimum width (W=30 mm).

The objective assembly may also be provided with an optional protective cover 330 composed of quartz. A support element (not shown) can be attached to the objective assembly to allow certain accurate displacements of the objective assembly's axis which are performed as a function of the offset of the focalized bundle of rays (or beams) which form the image 340. Such adjustment makes it possible to obtain a spatial position of the focalized beam preferably identical for all imaging modules in the imaging assembly (discussed further herein) in relation to particular reference points.

Figure 9:
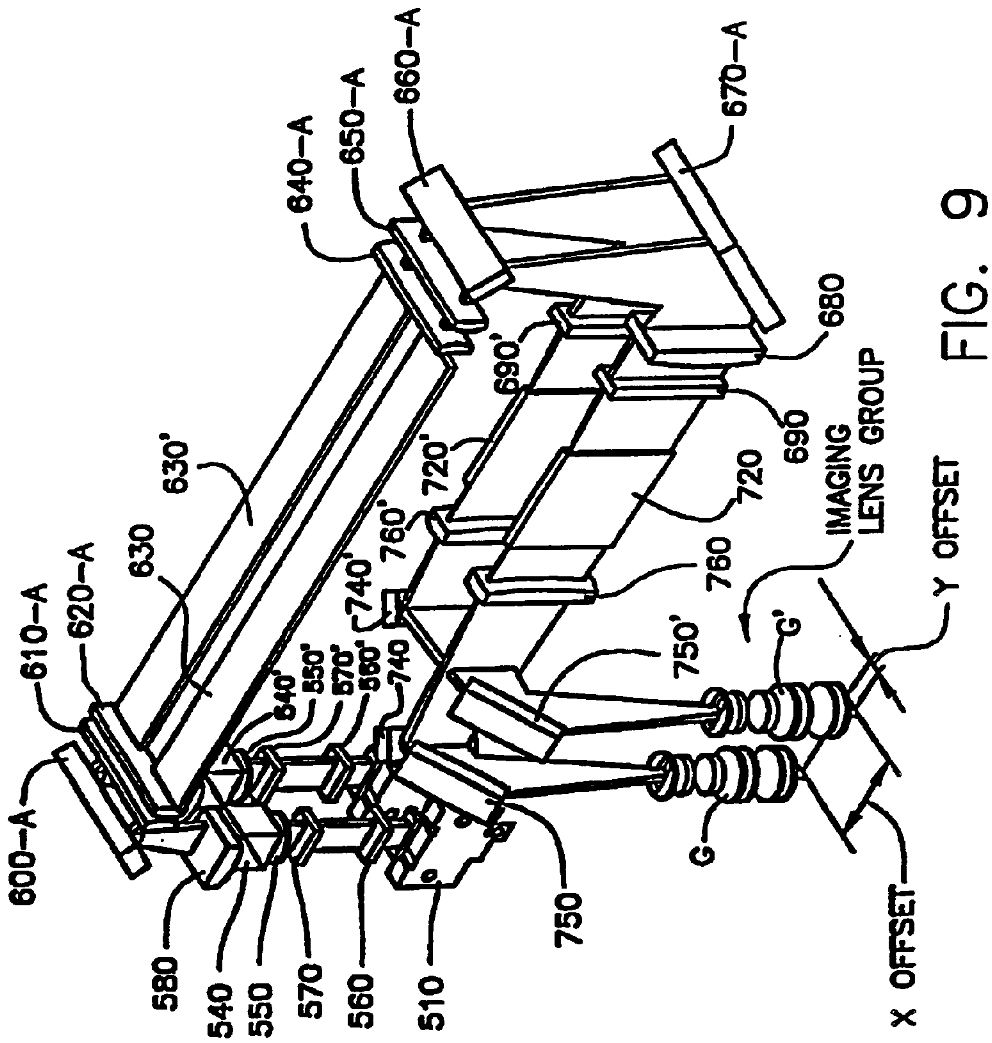
FIG. 9 represents an exploded view of an imaging head in accordance with another embodiment of this invention.
Figure 10:
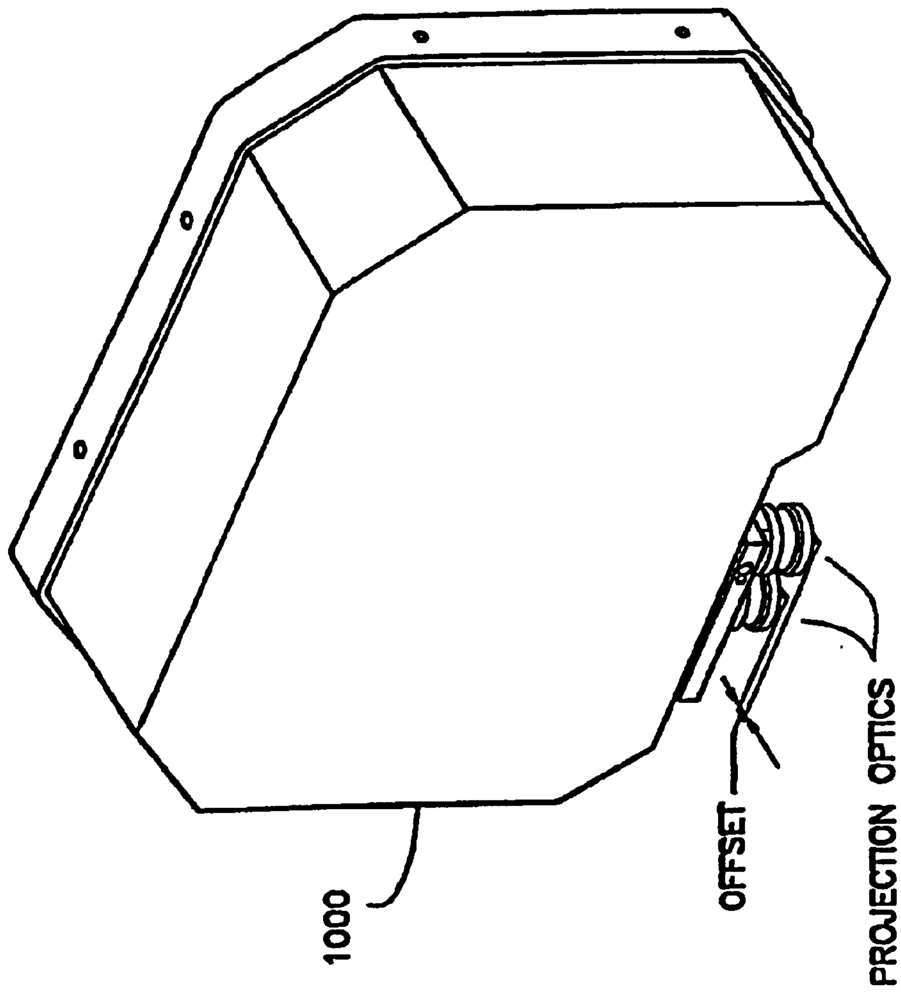
FIG. 10 represents an external view of the imaging module of FIG. 9.

In another embodiment of this invention, the compact imaging module or head which may be employed in the assembly and method of this invention is as depicted in FIGS. 9 and 10. FIG. 9 represents the interior view of the components of a duplex imaging head which contains laser sources 510 and 510' which are typically a laser diode as previously described with respect FIGS. 2A–2B and 3A–3C. The beams from laser source 510 are directed to a corresponding first set of optical arrangements which comprises lenses 560 and 570, half-wave blade 550, polarizing cube 540 and lens 580. Similarly, the beams from laser source 510' are directed to a corresponding optical arrangement which comprises lenses 560' and 570', half-wave blades 550 and 550', polarizing cube 540' (not shown) and lens 580' (not shown). The beams emerging from the corresponding first optical arrangements are directed to a first common optical arrangement which in this embodiment comprises mirror 600A and lenses 610A and 620A. The image of the emitters from laser sources 510 and 510' exit the first common optical arrangement via lens 620A and respectively form an image of the laser sources at the input faces of second corresponding optical arrangements which in this embodiment comprise imaging blades 630 and 630' as shown. The beams emerge from mixing blades 630 and 630' and are directed to a second common optical arrangement which in this embodiment comprises lenses 640A and 650A and mirrors 660A and 670A. The beams are then respectively directed to third corresponding optical arrangements comprising lenses 680 and 690 (for laser source 510) and lenses 680' (not shown) and 690' (for laser source 510'). The beams emerge from the third corresponding optical arrangements and the beams of the corresponding fast axes are directed to an active zone of modulators 720 and 720', respectively. These modulators are of the configuration and operate as the modulators previously described with respect to FIGS. 2A–2B and 3A–3C. The beams emerge from the modulators 720 and 720' and are respectively directed to corresponding fourth optical arrangements as shown in FIG. 9, which comprise lens 760, mirrors 740 and 750, and imaging lens group G (for laser source 510), and lens 760', mirrors 740' and 750', and imaging lens group G' (for laser source 510'). As is also depicted in FIG. 9, the imaging lens groups G and G' are offset in a direction perpendicular to the travel path of the scanning carriage as is explained further herein. The offset corresponds to the offset shown as 51 in FIG. 1C described herein. The beams are projected by imaging lens groups G and G' to the imageable medium (e.g. printing plate) to be imaged.

FIG. 10 depicts a view of the exterior of the imaging assembly of FIG. 9. In FIG. 10, the housing 1000 contains the elements previously described with respect to FIG. 9, and the housing maybe detachably or fixably coupled to the carriage, as is further described herein.

In additional embodiments of this invention, the imaging module or head used in this invention may compromise the optical elements described in U.S. Pat. No. 6,169,565, which is incorporated herein by reference.

Modular Imaging Assembly

Figure 1A:
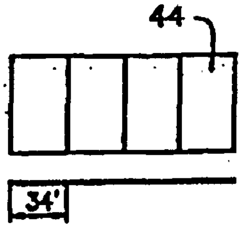
FIGS. 1A and 1B illustrate an assembly of individual modules.

A modular imaging assembly in accordance with the present invention refers to the assembly of identical interchangeable imaging heads referred to as modules detachably coupled or mounted on a common carriage. FIGS. 1A, 1B, 1C and 1D schematically illustrate various embodiments of the present invention. One of the objects of this invention is to increase the production speed of platesetters in which the printing plate and the imaging optics are moveable relative to each other to produce successive joining bands of pixels to image a printing plate. Such systems are described, for example, in U.S. Pat. Nos. 4,746,942 and 4,819,018, and WO 00/49463, all of which are incorporated herein by reference. The number of pixels that can be produced and projected by a single imaging module to form a band of pixels is limited for the reasons discussed above. In theory, if it were possible to manufacture an imaging module or head no larger than the width of a brush (for example 256 pixels) several heads 44 could be affixed face to face on a common carriage (as shown in FIG. 1A), thus increasing the number of pixels that could be swept across a plate for imaging in one excursion of the carriage. However, such an arrangement is impossible in the present state of the art. The width of each head would be limited to the width of a brush, for example to 5.2 mm to produce adjacent brushes of 256 pixels of 20 microns. An assembly of four such theoretical heads, each one-brush-wide, is illustrated in FIG. 1A.

Figure 1B:
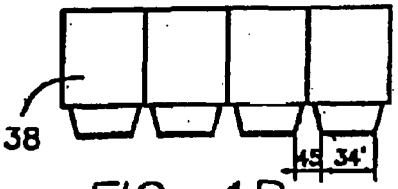

FIG. 1B represents an assembly of four modules or heads 38 mounted side by side on a common carriage using technology available to those skilled in the art prior to this invention. For example, each head may be magnetically removably attached to the carriage on which it may be accurately positioned by pins, as is well known in the art. As shown in FIG. 1B, this arrangement is unacceptable because gaps 45 would be left between each band of pixels or brushes 34'. It is an important object of this invention to eliminate such gaps.

Figure 1C:
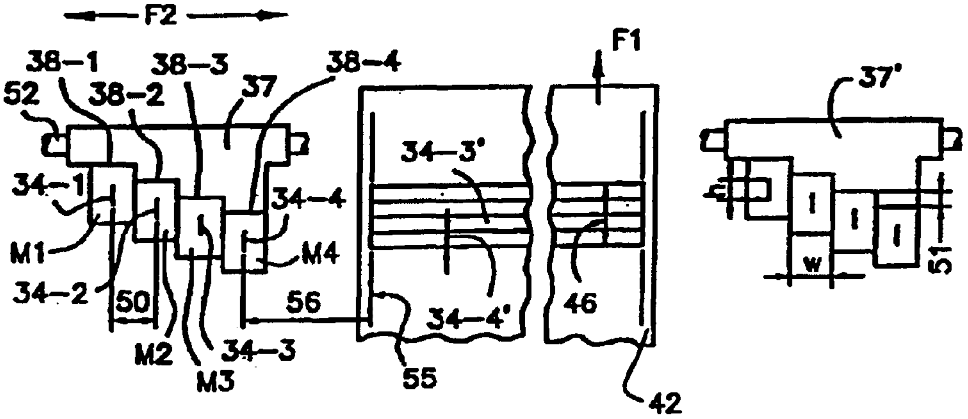
FIG. 1C represents a modular imaging assembly in accordance with an embodiment of this invention.

This object of the present invention is accomplished by the imaging assembly of this invention schematically illustrated in FIG. 1C, representing schematically various components of a flat-bed platesetter such as described in WO 00/49463 in detail. Imaging carriage 37, sliding on rails 52 moves or traverses continuously from one edge of plate 42 to the other edge for the projection of a swath of pixels on a light or heat sensitive medium for imaging thereof. Four joining bands (i.e. 34-1', 34-2', 34-3' and 34-4') each 256 pixel-wide, are projected at each excursion of carriage 37, from left to right and vice versa. The result is the projection of a swath 46 having a width of 1024 pixels at each excursion of the carriage. This result is obtained, as shown on the left side of FIG. 1C, by locating individual imaging modules or heads M-1 to M-4 (projecting pixel brushes 34-1, 34-2, 34-3, and 34-4 respectively to generate respective bands 341', 34-2', 34-3' and 34-4') at different levels 38-1, 38-2, 38-3 and 38-4 of the carriage. These levels are precisely determined such that consecutive pixel brushes 34-1, 34-2, 34-3 and 34-4 are exactly aligned, so that the bottom portion of a brush abuts exactly the top portion of an adjacent brush as per the orientation of FIGS. 1C and 1D. The modules are thus aligned with respect to one another such that the plurality of modules imagewise produce laser light which is a summation of each individual light brush produced by each module. This alignment is achieved by employing the stair-like arrangement of the modules as described above, coupled with the delay in the imagewise projection of each brush image or swath, which is accomplished as discussed below.

Figure 11:
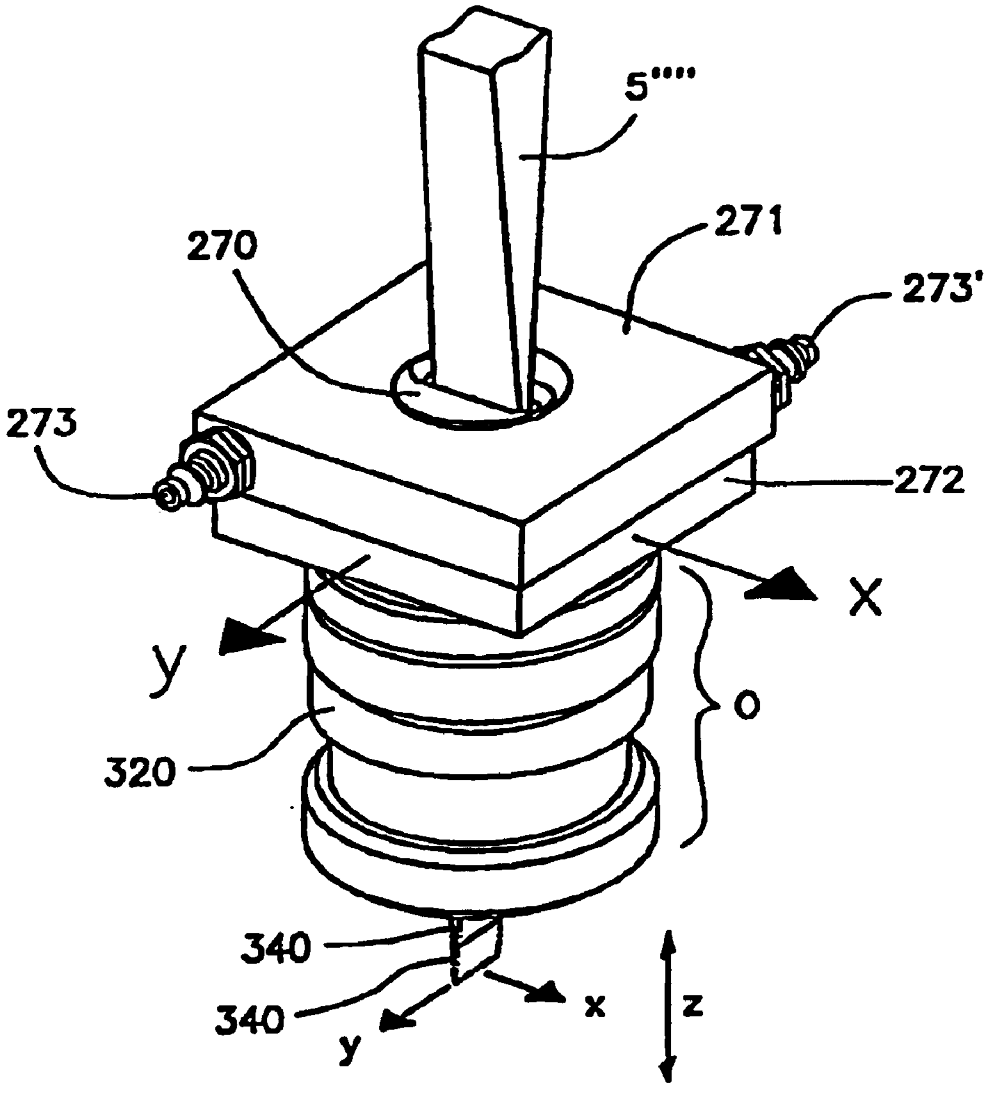
FIG. 11 represents the components employed in this invention located at the end of the optical path and method of adjustment thereof.

It will be apparent to those skilled in the art that the operation of the system described above and depicted in FIG. 1C requires adequate differential timing or compensation for the projection of each band. Referring to the operation of a similar carriage as described in WO 00/49463, as carriage 37 travels from an extreme location (i.e. the near side of the imaging area) shown on the left side of FIG. 1C to the right (arrow 172) carriage 37 comprises an edge detector coupled with a signal generator which generates pulses that continuously inform (via detectors, etc. which are not shown) an electronic controller (not shown) of the position of carriage 37 relative to the edge of the imaging area of the plate, shown at 55. The edge detector is mounted on the head. The edge detector employed may be, for example, a plate edge detector as described and referred to in WO 00/49463, particularly FIG. 11 therein. Control of the length and position of the carriage traverse across the width of the plate may be achieved using an encoder as described for example, in WO 00/49463 together with the signal generator which generates pulses as previously described. When the "potential" brush image 34-4 (i.e. the laser energy emitting from a module prior to imaging actually commencing, as described herein) emerging from the first module M-4 has moved by a distance 56 it crosses the image area boundary 55, preferably detected by an edge detector mounted on the head as described in WO 00/49463, and the module is activated to start the projection of the first imaging swath or brush 34-4'. The projection of the second swath or brushing 34-3' from module M-3 will begin as soon as carriage 37 has produced an input signal to the controller via a signal receiver that potential brush image 34-3 has moved a number of pixels corresponding to the distance 50 separating each module in the direction of the scan. Thus, delaying the projection of the second swath 34-3' will compensate for the vertical offset 51 of module M-4 in relation to module M-3 and produce a second swath in exact alignment with swath 34-4'. As the carriage 37 continues its movement to the right, the following potential brush image will be delayed by the same number of pulses followed by the projection of the next swath, and so on. After the carriage has reached its extreme position beyond the edge of the plate on a side of the imaging area, plate 42 is moved up by an amount 46 corresponding to the accumulated width of adjacent swaths. After a short delay necessary for the motion reversal of the carriage and plate feed, carriage 37 (depicted as 37') moves back to the left and the same sequence as described above will occur except that module M-1 (preferably equipped with an edge detector) will be the first to cross the imaging boundary. Plate feeding may be accomplished via stepwise movement employing plate feeding techniques and equipment well known to those skilled in the art, such as described in WO 00/49463. It can thus be seen that the mechanical offsetting of modules, necessary to accommodate the size of modules is compensated by appropriate electronic circuitry, as will be well understood by those skilled in the art. The timing or delay in the imagewise projection of each brush image or swath is accomplished by retarding the image production of sequential brush projections so that the continuously moving carriage 37 has moved a distance from the edge of the plate 42 to place the image of the new scan in alignment with the previous scan. This may be accomplished, for example, by employing an encoder system as described, for example, in WO 00/49463. Thus, the above-described differential timing or compensation is achieved.

Figure 1D:
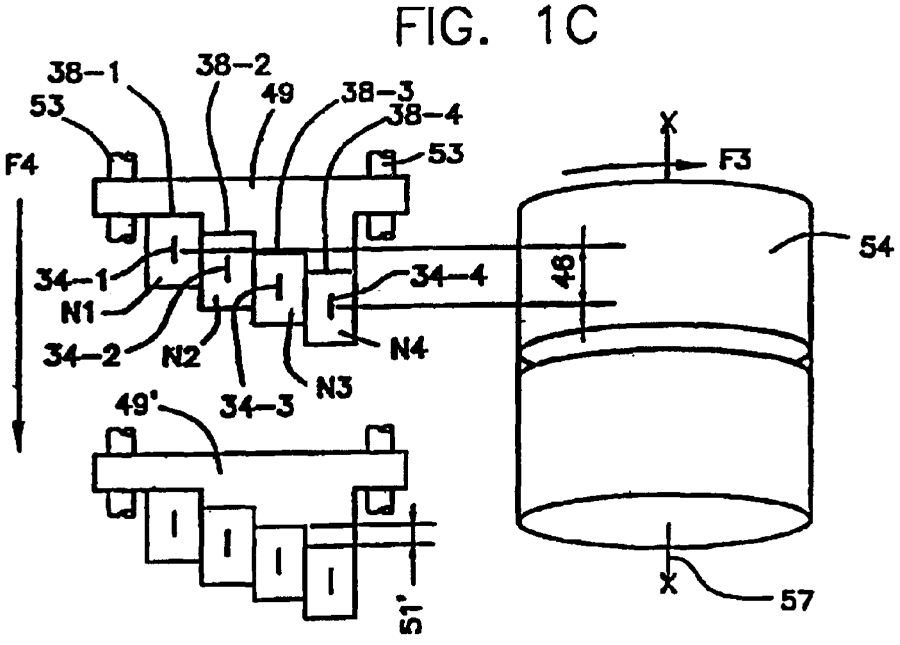
FIG. 1D represents another modular assembly in accordance with an embodiment of this invention.
Figure 1E:
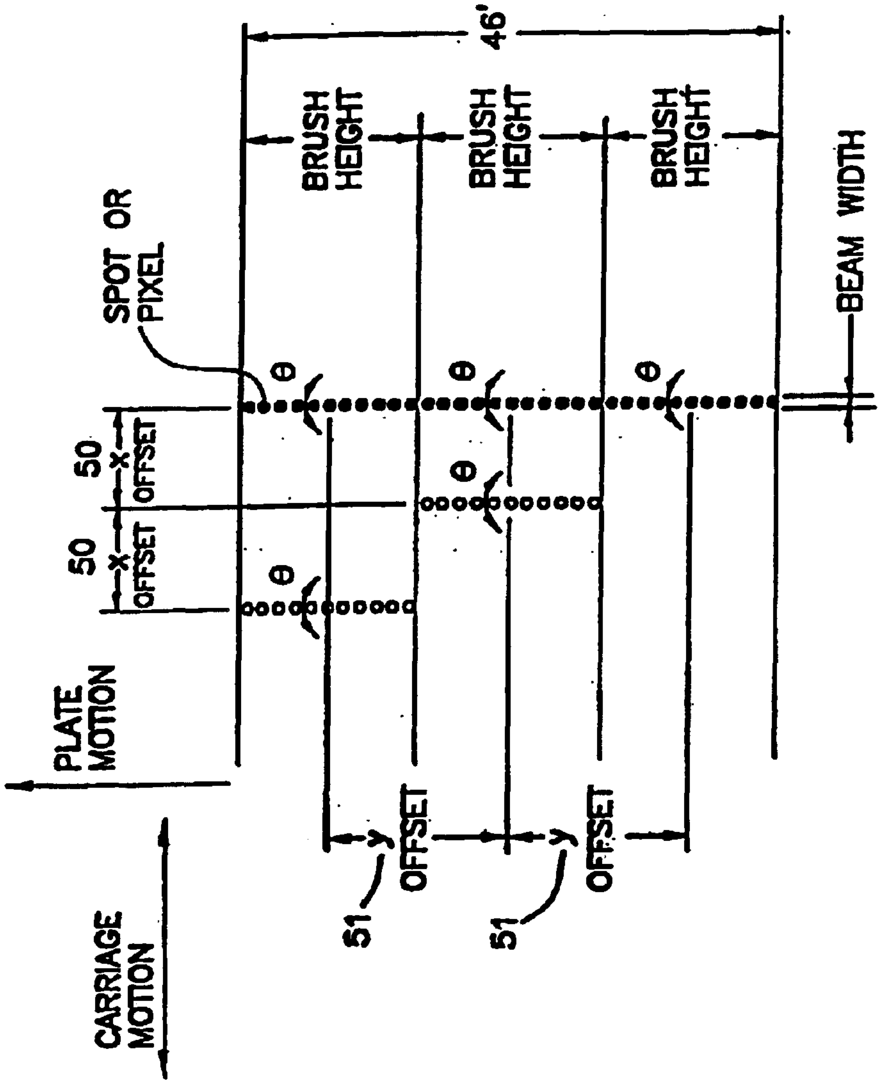
FIG. 1E illustrates the definition of various terms used in the description of this invention.

The present invention is equally applicable for use in conjunction with systems in which the printing plate to be imaged is attached to a drum, for example as illustrated in U.S. Pat. No. 4,819,018. This embodiment is described in relation with FIG. 1D. In FIG. 1D, similar modules as described above are shown by references N1 to N4. They are attached to carriage 49 supported by rails 53 so that carriage 49 can slide in a direction parallel with the axis 57 of drum 54. The modules are also offset by the same amount as described with respect to FIG. 1C. In one mode of operation carriage 49 is stationary while drum 54 makes one turn to produce one swath of pixels shown at 46 representing the combined projection of four swaths. The procedure is similar to that described above for FIG. 1C except that it is the drum 54 that produces pulses indicating the location of the imaging area relative to the modules, not the carriage. As carriage 49 is stationary, the projection of the second band of pixels is delayed until the surface of drum 54 has moved a distance corresponding to the offset 51' of the second module, and the projection of bands proceeds as described above with respect to FIG. 1C. After the completion of one revolution of drum 54, the wide composite band is produced and carriage 49 moves down by a distance equal to the width of this band. In another mode of operation, carriage 49 moves continuously in synchronism with the continuous rotation of the drum as described in U.S. Pat. No. 4,819,018 and four (4) bands of pixels are projected during each rotation. This arrangement makes it possible to increase the production speed, reduce the speed of the drum, or both, as this may be desirable to reduce the detrimental effect of the centrifugal force of the rotating drum 54 to the attached plate.

Adjustment of Beam Width

The width of the beam (e.g. 340 in FIG. 2B) is the image of the width of the beam at the modulator level for the fast axis of laser source 10. In a preferred embodiment of this invention in which the modules are interchangeable, the width of each bundle of brush-forming beams focalized on the plate imaging location and emerging from different modules must be identical in shape and power. To this end, the present invention also may include adjustment of the width of each bundle, its height and spatial position and equalization of the useful power of laser emitter bars to compensate for their unavoidable differences in features. Such features include polarization, smile, quality and location accuracy of the fast-axis collimating lens, emitted power and aging of the different laser sources (e.g. diodes).

Figure 4A:
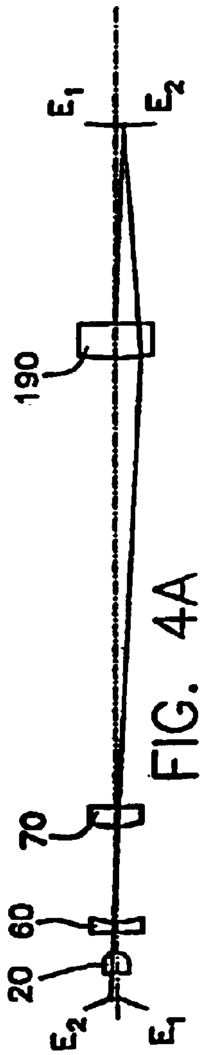
FIGS. 4A, 4B and 4C represent the effect of non-aligned laser emitters on the focalization of the fast axis rays on a modulator.
Figure 4B:
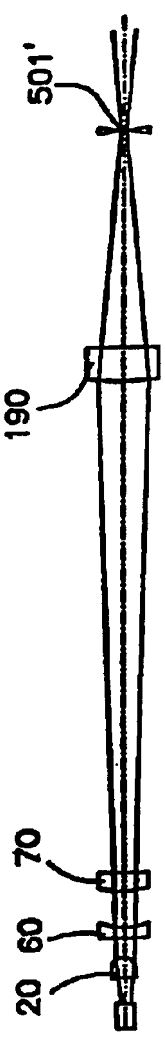
Figure 4C:
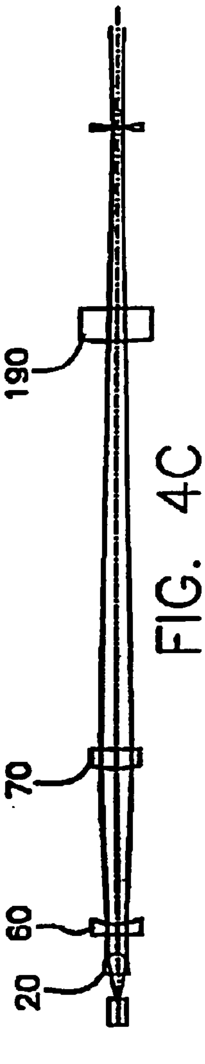
Figure 4D:
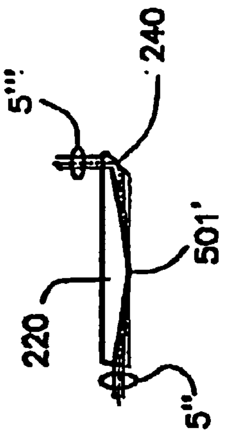
FIG. 4D represents how the crystal is cut to fold the beams.
Figure 5:
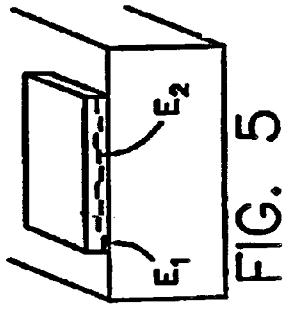
FIG. 5 represents the "smile" of a laser bar.

FIGS. 4A, 4B and 4C schematically represent the optical components affecting the fast axis at the exclusion of other components not shown in the figures. In these figures, the focal plane of lens 190 corresponds to the active zone of the modulator. As is well known to those skilled in the art, the emitters of laser bars are not perfectly aligned, but rather are located on a curved shape due to manufacturing defects which are difficult to control. The deviation of the shape of a laser bar from a straight line is termed the "smile" of a laser bar, as described, for example, in U.S. Pat. No. 6,166,759. FIG. 5 represents the "smile" of a laser bar. The location of emitters such as E1 and E2 is spread around the imaging axis of collimating lens 20 for the fast axis. Positioning variations are strongly amplified at the focal plane 501' of lens 190 and consequently at the imaging plane 400, where objective O (See FIG. 3B') forms an image of 501'.

As discussed in U.S. Pat. No. 6,166,759, smile causes cross-array position errors of an emitter array such as a laser diode array. U.S. Pat. No. 6,166,759 discloses a mechanical apparatus for correcting smile. In contrast, the present invention employs an optical method for correcting the effect of smile on focalization.

The effect of positioning variations is also shown in FIG. 4A, where emitters E1 and E2 are projected at E1' and E2'. For example, the deviation of one micron of one emitter relative to the imaging axis results in a deviation of 35 microns at the plane level 400. Consequently, the beam width depends on the essentially variable smile of the laser diodes. The width of the beam is also imposed by the value of the diffraction limit, consequently by the width and distribution of rays on lens 190. The latter depends on the positioning accuracy of the collimating lens 20 in relation to the emitters and on the spacing between lenses 60 and 70. A small departure from the ideal position of collimating lens 20 results in a significant change of the divergence of the beam affecting the width of the "diffraction limited" beam at plane level 400. For example, by reducing by one micron the distance between the emitters and the collimating lens 20 relative to its theoretical position where the beam is perfectly collimated, the beam divergence is increased, thus the width of the beam on lens 190 and the width of the "diffraction limited" spot changes from 42 to 28 microns. Thus variations in the positioning of collimating lens 20 result in changes of the width of the beam at plane level 400.

It follows from the above that increasing the smile causes an increase of the width of the beam whereas increased divergence causes its reduction. The goal is to balance these two effects to obtain a beam of constant width for all modules. When the diode has a low smile, divergence will be reduced to increase the width by diffraction. This reduction of the divergence is obtained by increasing the spacing of lenses 60 and 70 (FIG. 4C). However, if the smile is more important, the divergence will be increased by reducing the spacing between lenses 60 and 70. The divergence may be adjusted by adjusting the spacing between lenses 60 and 70 to obtain a beam of constant width at the image location at plane level 400 where the writing beam is focalized and is also the location of the sensitive face of the printing plate. Accordingly, for example, in one embodiment, lens 60 is negative, F=−40 mm causing the divergence of rays and lens 70 is positive, F=+50 mm causing the convergence of rays. By adjusting the spacing between these lenses it is possible to compensate for the divergence variations of different laser diodes. Theoretically the principle of compensation by adjustment of the divergence is possible without lenses 60 and 70 by adjusting only the location of collimating lens 20. Thus, as depicted in FIGS. 4A–4C and described herein, the divergence of the rays may be adjusted.

Power Adjustment of the Modules

Figure 6:
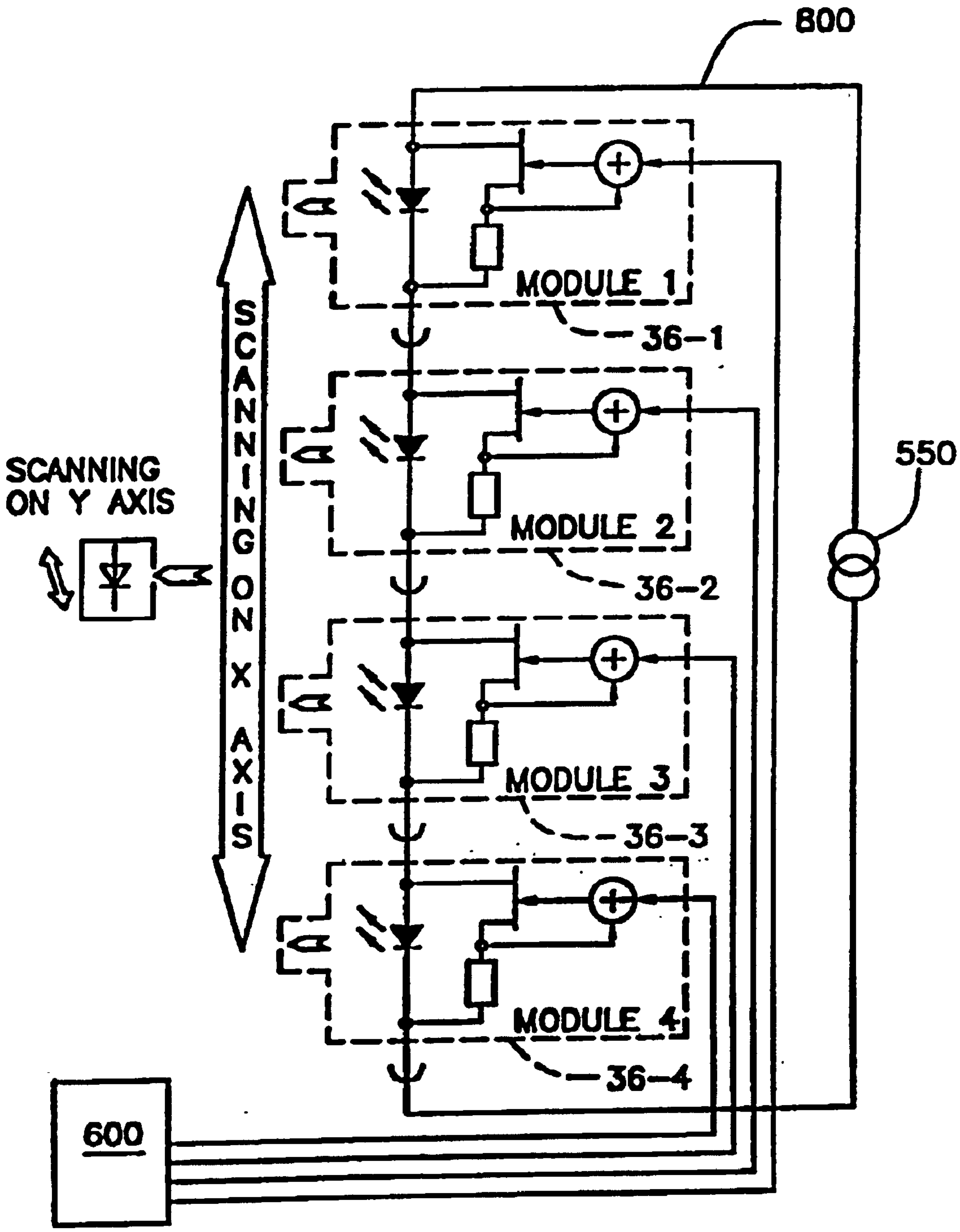
FIG. 6 is a schematic depiction of the adjustment of the power of laser diodes in each imaging module in an embodiment of the imaging assembly of this invention.

As shown in FIG. 6, to adjust the power of each of the modules 36-1, 36-2, 36-3, 36-4, it is possible to utilize a separate power supply for each module (e.g., the exemplary module shown in FIGS. 2A, 2B, and 3A-3C) controlled by a processing device 600 (e.g., a personal computer (PC)) to generate a predetermined power. However, in such an embodiment the carriage 37 (in FIG. 7) should pull the end of two 50 ampere cables for each of the modules 36-1, 36-2, 36-3, and 36-4.

According to one embodiment of the present invention, it is possible to connect the laser sources (e.g. diodes) of the respective modules 36-1, 36-2, 36-3, and 36-4 in series. Thus, only a single power supply would be necessary to power the modules 36-1, 36-2, 36-3, and 36-4, and the carriage 37 has only the end of two cables to pull to provide the power for all modules 36-1, 36-2, 36-3, and 36-4. However, in this instance the emitted power will differ for each of the modules 36-1, 36-2, 36-3, and 36-4. As shown in FIG. 6, an impedance circuit may be controlled by the processing device 600. In this embodiment, each laser source of the respective module can be shunted via a shunt. Therefore, a fraction of the current which would be necessary to power each module separately can be applied to the shunted diodes so as to reduce the power needed to drive the better performing modules, each module thereby equalizing performance of the better performing and weaker performing modules. The shunt is based on an MOSFET circuit (such as is available from International Rectifiers, Inc., El Segundo, Calif.) with a counter-reaction loop, and controlled by processing device 600 (e.g. a PC card) in accordance with power values measured at the output of each of the modules 36-1, 36-2, 36-3, and 36-4. For example, the MOSFET circuit with counter-reaction loop may be controlled by a signal produced by a PC card in accordance with power values measured at the output of each module.

Positioning of Modules

Figure 7:
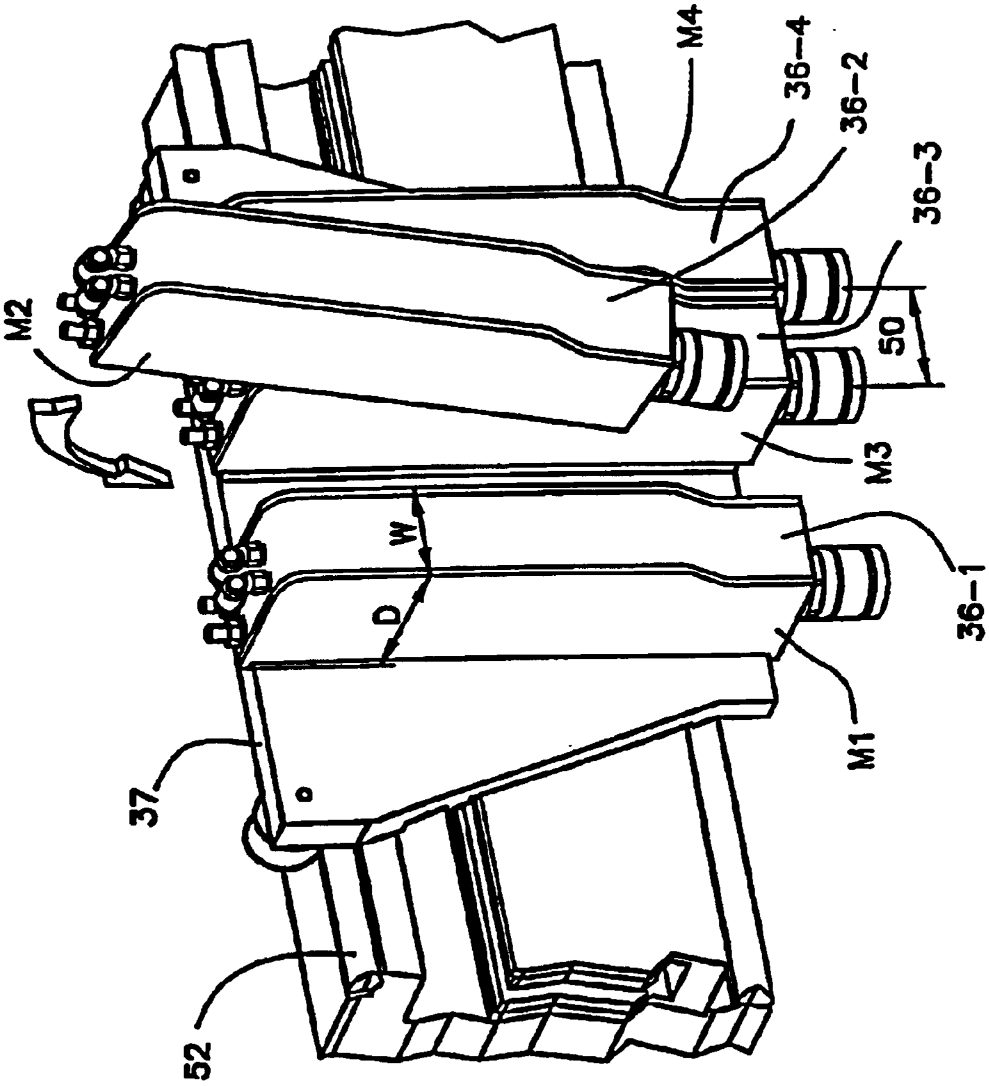
FIG. 7 is an embodiment of this invention in which the imaging assembly comprises four (4) imaging modules.

An exemplary illustration of an assembly having four imaging modules 36-1, 36-2, 36-3, and 36-4 according to the present invention is shown in FIG. 7. Each of these modules is removable from a carriage 37, and thus easily replaced if such module becomes defective and/or unusable. As shown in FIG. 7, each of the modules 36-1, 36-2, 36-3, and 36-4 can be magnetically attached to the carriage 37 to permit its rapid removal and change. For example, these modules 36-1, 36-2, 36-3, and 36-4 may be positioned on the carriage 37 (with a high accuracy) so that the location of different bands permits a substantially exact juxtaposition. However, in other embodiments the modules may be either detachably coupled or rigidly fixed to the carriage.

Figure 8:
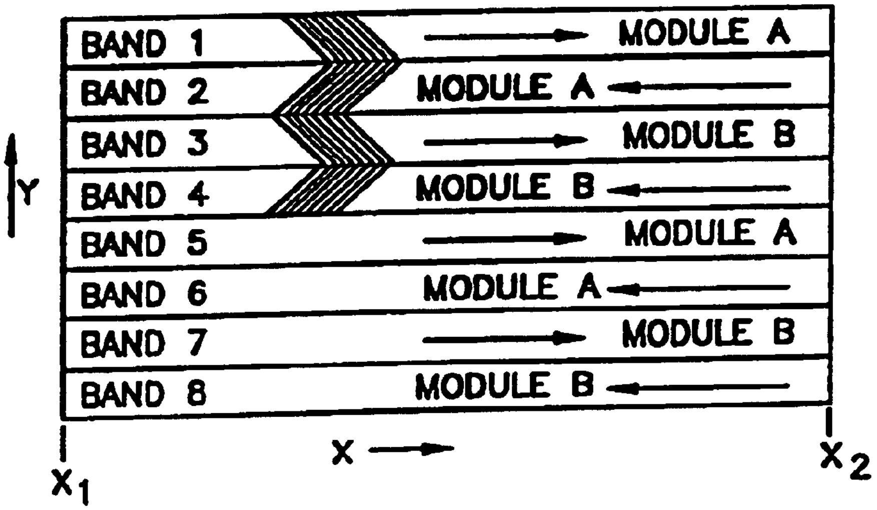
FIG. 8 is a schematic depiction of the imaging of a printing plate using alternative exposure of bands in accordance with one embodiment of this invention.

In another embodiment of this invention, a plurality of compact imaging modules as previously described may be coupled to the carriage in a manner such that the modules are separated along the X-axis (i.e. in the direction of the carriage path) and in the Y-direction (i.e. in the direction of the plate's motion). The spacing between imaging bands may be one or several band widths. For example, in one embodiment two modules (referred to herein as Module A and Module B) are coupled to the carriage and the imageable plate is arranged to be incrementally or stepwise moved as will be well understood by those skilled in the art. As depicted in FIG. 8, Band 1 is generated on the plate by Module A and Band 3 is generated on the plate by Module B as the carriage moves in the X direction from a first position X1 to a second position X2 in a first "sweep" carriage across the plate. The plate is then moved one band width in the Y direction, and the carriage moves from position X2 back to position X1, thereby generating Band 2 from Module A and Band 4 from Module B as the carriage makes a second sweep from position X2 to position X1. The plate is then moved three (3) band widths in the Y direction, such that Band 5 is generated by Module A and Band 7 is generated by Module B as the carriage makes a third sweep from position X1 to position X2. The plate is then moved one (1) bandwidth in the Y direction, and the carriage makes a fourth sweep from position X2 to position X1, such that Band 6 is generated by Module A and Band 8 is generated by Module B. This procedure may be repeated until the plate is fully imaged as desired. Other configurations involving alternative spacing of the modules will be apparent to those skilled in the art.

Adjustment of Components

In FIGS. 3A', 3B' and 3C' the reference numbers located within "white" outlined arrows and referred to parenthetically below represent the displacements of major components corresponding to components of FIGS. 3A, 3B and 3C. The numbers between "black" arrows represent the effects of the displacements of components associated with white arrows at the "stop" member 270 for some and at the plate level for others. As shown, a tilt (1) of the laser source 10 moves beams 5"" along axis x at the entrance of member 270. Lateral displacement (2) of lens 180 is used to center the beam 5"" on the aperture of stop plate 270 along axis y. Vertical displacement (3) of lens 60 is used to adjust the beam divergence affecting the final image as represented at 3. Vertical displacement (4) of lens 320 is used to move the image to position it at the exact plane of the plate, as shown at 4 without affecting the height "h" of the brush. Rotation (5) of lens 190 permits the accurate orientation of the final image, as shown at 5. Up and down displacement (6) of lens 260 is used to adjust the height of the brush. Displacement along (7) of lens 190 is used to center the beams to the active zone of the modulator 15. Each of the adjustable components mentioned above is attached to a support with a locking mechanism permitting accurate positioning. In one preferred embodiment each module is provided with, adjustable locating elements such as set screws or the like which enable each module to be independently adjusted on a jig for location of each module brush in accordance with x, y and z coordinates. These necessitate visual observation as explained below.

Visual Observations

1. Centering the Beam on the Stop Plate (1) and (2)

To facilitate the centering adjustment the stop 270 is mounted on the same support as the diode and the associated optical elements: i.e. lenses, mirrors and modulator. The objective assembly O is independent of the stop, and can be removed without affecting the arriving beam (See FIG. 3B'). For visual observation it may be replaced with an IR camera with appropriate optics to visualize the beam on the stop. The camera "sees" the rays exiting the slit (aperture) of the stop. One adjustment (2) is to position rays of zero order exactly at the center of the slit of the stop slow axis of the diode, Y (see FIG. 3B'). This adjustment is important to obtain the best separation of diffraction orders and consequently the best contrast.

On the other axis (X) centering is also important to reduce optical aberrations to a minimum. The result is obtained by adjusting the angle of the beams emerging from the assembly laser diode-collimating lens for the fast axis. This adjustment can also be obtained by displacing the optical axis of lens 60 or 70.

2. Adjustment of the Beam: Width (3), Focalization (4) and Orientation (5)

Observation and measurement may also be made with the aid of an IR camera equipped with a microscope objective. The image of the beam is formed at the exposure plane 400, with the objective O (FIG. 3B') in place.

The adjustment of the beam width along (X) is obtained by adjusting the spacing between lenses 60 and 70 (3). This adjustment modifies the divergence of the beam emerging from lens 70 as per fast axis (X). This changes the width of the beam on the objective for this axis, and results in a change of the width of the beam at the focal plane 400 in accordance with the diffraction laws. However, a variation of the divergence causes a variation of the location of the focalization plane of lens 190. This plane must remain, according to the direction of the light propagation, on the center of the active zone of the modulator which can be obtained by the translation of lens 190 (3'). This is so because the projection optics reproduces the image of the beam in the active zone of the modulator. For the slow axis (Y) it is the physical image of the modulator gates and for the (X) axis, it is the focalizing zone of lens 190. The best image of the pixels is obtained by making the best image of the gates along one axis and the best focalization along the other axis to coincide.

The positioning of the focalized beam 5"" on the theoretical plane of the plate is obtained by adjusting the location of lens 320. Vertical displacement of lens 320 (4) does not affect the width of the imaging beam but only its vertical position in relation with the plate (4).

The orientation (5) of the beam is obtained by rotating lens 190 (5) around propagation axis Z.

3. Adjustment of Brush Height

Adjustment of the brush height is obtained by displacing lens 260 (6). This dimension is also measured with the help of a camera and a micrometric table.

4. Centering the Beam on the Active Zone of the Modulator (7)

All the energy contained in the beam must be submitted to a reflection in the electroded zone of the modulator. This requires precise and stable control of thermal influences of the beam focalized by lens 190. Because this lens makes an image of the laser bar, the location of this image is independent of the angular drifts of the emitted rays of the bar. However an adjustment (6) is necessary to compensate for errors caused by manufacturing tolerances.

5. Adjustment of the Distribution of Energy Rays

To obtain a uniform distribution at the output of the blade 130, the beam must enter the blade with a good angular symmetry. The latter depends strongly on the locations of lenses 30, 80, 110 and 120. An adjustment is necessary to compensate mechanical and optical tolerances to obtain a perfectly uniform distribution. Translating lens 80 preferably performs the adjustment. It can also be obtained by translation lenses 30, 110 and 120. The adjustment can be checked with a measuring set up, as will be well understood by those skilled in the art.

6. Adjustment of Emission Intensity of the Laser

The intensity is measured by a calibrating cell involving a slit and a photodiode as shown in WO 00/49463. A computer regulates the current derived to the shunt obtained by MOSFET in parallel on the diode to equalize the measured and assigned value.

7. Adjustment of X and Y Positioning of Brush Image

In the multibrush case, as in a modular arrangement, the distance from brush to brush must be rigorously respected and remain stable. To this end objective O is mounted on a support allowing the displacement of its optical axis. This permits the precise positioning of the exiting beam with respect to axes X and Y (See FIG. 11).

The adjustments described above make it possible to manufacture heads or modules producing brushes with identical characteristics and uniform intensity distribution. Thus banding phenomenon can be avoided and interchangeability of heads or module without re-adjustment is made possible.

While the invention has been described with reference to its preferred embodiments, it will be understood by those skilled in the art that various changes may be made without departing from the scope of the invention. For example, although the exemplary embodiments of the present invention has been described above with reference to their uses in flat bed plate-setter systems, they are also applicable to rotating drum systems, such as those described in U.S. Pat. No. 4,819,018, the entire disclosure of which is incorporated herein by reference. Moreover, although the assembly and method of this invention herein described relate to embodiments wherein independent and interchangeable compact imaging modules mounted on a common carrier co-operate to project line segments on a photoreceptor, it should be understood that any imaging assembly moving relative to a photoreceptor to produce continuously straight lines of laser energy composed of abutted individual segments successively projected in a timely manner is within the scope of this invention.

The invention claimed is:

1. An optical head comprising:

a single laser source of beams at an input end and image forming beams at an output end;

a plurality of optical components along said beams between the input and output ends to obtain an image on a photosensitive printing plate from the beams, wherein the optical components include reflecting surfaces adapted to fold the beams a plurality of times between the input and output ends such that the folded beams are located in a plurality of parallel surfaces perpendicular to the image formed on the photosensitive printing plate; and a lens to adjust the spatial position of the image from the beams.

2. The optical head of claim 1, wherein the laser source comprises a laser bar or a laser diode having a plurality of emitters.

3. The optical head of claim 1, further comprising a modulator cooperatively arranged with the laser source to produce an image.

4. The optical head of claim 1, further comprising a total internal reflection modulator.

5. The optical head of claim 1, further comprising a modulator having one or more drivers.

6. The optical head of claim 5, wherein the modulator drivers are directly attached to a crystal of the modulato.

7. The optical head of claim 6, wherein the crystal is a total reflection crystal having at least one prismatic edge adapted to deviate the beams by 90 degrees.

8. The optical head of claim 1, further comprising an optical mixer adapted to equalize the beams from the laser source.

9. The optical head of claim 1, wherein the optical components further comprise an optical arrangement adapted to shape and direct the beams from the laser source to an optical mixer.

10. The optical head of claim 9, wherein the optical arrangement comprises a first lens, a second lens, a third lens, a half-wave blade and a polarizing mirror.

11. The optical head of claim 1, further comprising a first group of reflecting surfaces adapted to fold the beams from the laser source such that the size of the optical head can be reduced.

12. The optii:al head of claim 1, wherein the optical components further comprise an optical arrangement adapted to focalize and direct the beams from the laser source emerging from an optical mixer to a modulator.

13. The optical head of claim 1, further comprising a second group of reflecting surfaces adapted to fold the beams from the laser source such that the size of the optical head can be reduced.

14. The optical head of claim 1, further comprising a stop element adapted to eliminate the beams from the laser source of a higher diffraction order.

15. The optical head of claim 1 further comprising a lens adapted to focalize the beams from the laser source emerging from a modulator to a stop element.

16. The optical head of claim 1, further comprising an imaging objective assembly adapted to focus the beams from the laser source emerging from a stop element onto the photosensitive printing plate such that an image is formed on the photosensitive printing plate.

17. The optical head of claim 1, further comprising a spherical lens and a stop element, wherein the height of the image can be adjusted by changing the distance between the spherical lens and the stop element.

18. The optical head of claim 1, wherein the optical components are located in substantially the same plane.

19. The optical head of claim 1, wherein the optical head is adapted to produce 256 pixels of imagewise laser light.

20. The optical head of claim 1, wherein the optical head is adapted to project an image of the active zone of the modulator containing a plurality of pixels.

21. The optical head of claim 1, wherein the optical head is adapted to receive a signal to time the projection of the image.

22. The optical head of claim 1, wherein the optical head further comprises a lens to adjust the orientation of the image from the beams.

23. The optical head of claim 1, wherein the optical head further comprises a lens to adjust the intensity of the image from the beams.

* * * * *